United States Patent
Speidel

(10) Patent No.: US 7,002,026 B2
(45) Date of Patent: Feb. 21, 2006

(54) REMOVAL OF PROPYLENE GLYCOL AND/OR PROPYLENE GLYCOL ETHERS FROM AQUEOUS STREAMS

(75) Inventor: John H. Speidel, Media, PA (US)

(73) Assignee: Lyondell Chemical Technology, L.P., Greenville, DE (US)

(*) Notice: Subject to any disclaimer, the term of this patent is extended or adjusted under 35 U.S.C. 154(b) by 0 days.

(21) Appl. No.: 10/872,693

(22) Filed: Jun. 21, 2004

(65) Prior Publication Data

US 2005/0279623 A1 Dec. 22, 2005

(51) Int. Cl.
*C07D 301/32* (2006.01)
*C07C 27/34* (2006.01)

(52) U.S. Cl. .......................... 549/541; 568/672; 568/852
(58) Field of Classification Search ................ 549/541; 568/672, 852; 203/43
See application file for complete search history.

(56) References Cited

U.S. PATENT DOCUMENTS

| | | | |
|---|---|---|---|
| 5,434,280 A | * | 7/1995 | Peter et al. ................. 554/205 |
| 6,005,123 A | | 12/1999 | Dessau et al. |
| 6,063,942 A | | 5/2000 | Grey |
| 6,153,773 A | * | 11/2000 | Kolstad et al. ............. 554/169 |
| 6,281,369 B1 | | 8/2001 | Cooker et al. |
| 6,710,192 B1 | | 3/2004 | Hancu et al. |

FOREIGN PATENT DOCUMENTS

| | | | |
|---|---|---|---|
| DE | 1 095 433 | * | 12/1960 |
| FR | 1 554 016 | * | 1/1969 |

* cited by examiner

*Primary Examiner*—Virginia Manoharan
(74) *Attorney, Agent, or Firm*—William C. Long

(57) ABSTRACT

An aqueous stream containing propylene glycol and/or ethers thereof is treated by counter current liquid—liquid extraction with propylene and/or propane to separate the propylene glycol and/or ether from the aqueous stream.

5 Claims, 1 Drawing Sheet

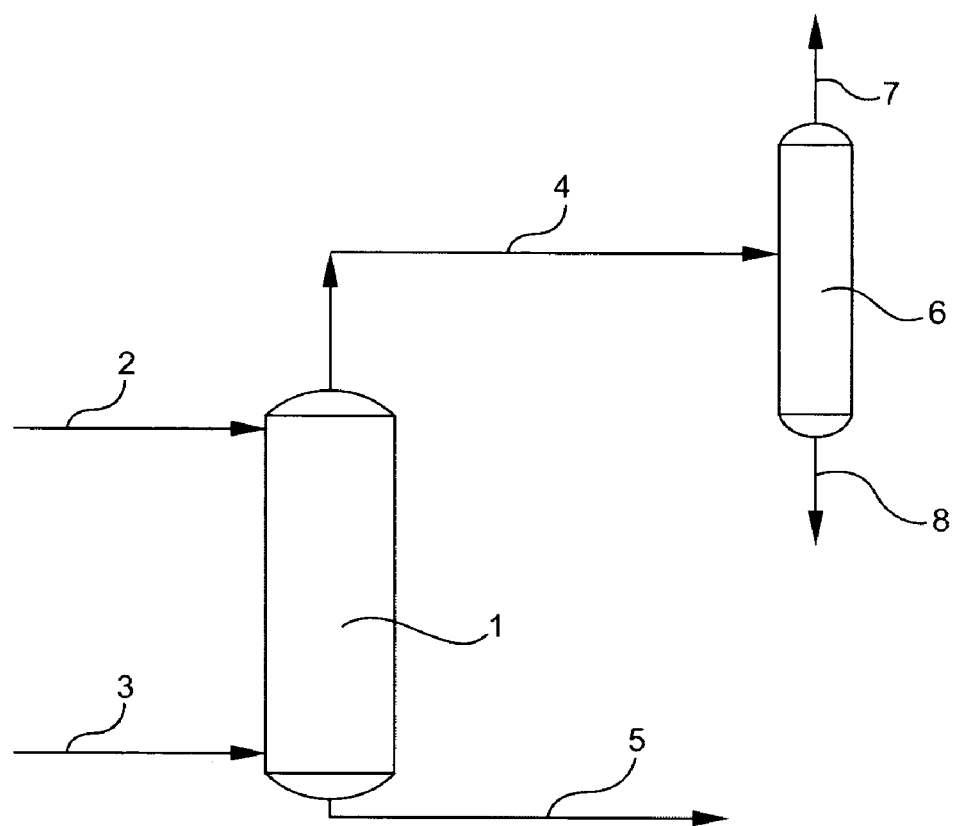

REMOVAL OF PROPYLENE GLYCOL AND/OR PROPYLENE GLYCOL ETHERS FROM AQUEOUS STREAMS

BACKGROUND OF THE INVENTION

1. Field of the Invention

The present invention relates to an improved process for the separation of propylene glycol and propylene glycol ethers from aqueous streams containing these materials.

2. Description of the Prior Art

A great deal of work has been done to develop improved processes for the production of propylene oxide. Such processes include direct oxidation processes whereby a mixture of propylene, oxygen and hydrogen are reacted in the presence of appropriate catalyst to form propylene oxide. See, for example, U.S. Pat. Nos. 6,710,192, 6,063,942, 6,281,369, 6,005,123 and the like.

In such procedures, large waste water streams are generated which contain propylene glycol and propylene glycol ethers, usually in minor amounts. Separation of the propylene glycol and ethers by distillation procedures is possible but quite costly since evaporation of substantially all of the water is required.

The development of new and improved procedures for the separation of propylene glycols and lower alkyl ethers thereof is an important objective.

BRIEF DESCRIPTION OF THE INVENTION

It has now been found that propylene glycol and propylene glycol ethers can effectively be separated from aqueous streams containing the same by counter current liquid—liquid extraction using propane and/or propylene as the extracting agent.

DESCRIPTION OF THE DRAWING

The attached drawing illustrates practice of the invention wherein the impurities-containing aqueous stream is contacted in extractor 1 with the organic extractant introduced via line 3, the aqueous steam reduced in impurities is removed via line 5 and the extractant stream is passed to distillation column 6.

DETAILED DESCRIPTION

The process of the present invention is especially applicable to the treatment of aqueous streams formed during direct oxidation processes for the production of propylene oxide. Such aqueous streams are comprised mainly of water and also contain significant amounts of propylene glycol and propylene glycol alkyl ethers. Usually the propylene glycol content by weight of these streams is about 1 to 30%, more particularly 5 to 15%, and the propylene glycol alkyl ether content is about 0.5% to about 10%, more particularly about 1 to 5% by weight.

It has now been found that the propylene glycol and ethers thereof can effectively be separated by a liquid—liquid extraction procedure using propane and/or propylene as the extraction agent. Since both propane and propylene are normally present in propylene oxide production processes, the separation process of the invention can be effected with materials used in the overall process without the use of extraneous and costly additional materials.

The invention can, perhaps, best be described with reference to the accompanying drawing. Referring to the drawing, extractor 1 represents a conventional multi-stage liquid—liquid extraction column having at least 5 theoretical stages, preferably having at least 8 theoretical stages.

The aqueous propylene glycol and glycol ether containing liquid stream is introduced to the upper section of the extractor via line 2 and the liquid extractant stream of propane and/or propylene is introduced to the lower section of extractor 1 via line 3. The conditions in extractor 1 are such that the propane and/or propylene extractant stream is maintained in the liquid phase during the counter current extraction contact in the extractor. In the extractor the propane and/or propylene stream and the aqueous stream containing the glycol and/or glycol ether are thoroughly contacted and admixed in accordance with conventional extraction procedures. The extractant stream passes upwardly through the extractor and is removed together with extracted propylene glycol and ethers thereof via line 4. The aqueous stream passes downwardly through extractor 1 and is removed substantially reduced in content of propylene glycol and ethers thereof via line 5.

The extractant stream can be passed via line 4 to distillation column 6 with the extractant propane and/or propylene being removed overhead via line 7 for reuse in the extraction or other use in the process and the extracted glycol and ethers separated via line 8 for use, for example, as fuel.

The organic extractant stream is propylene, propane or mixtures thereof in substantially any proportions. As above described, the aqueous stream to the extraction contains minor amounts of propylene glycol and/or ethers thereof, most notably methyl ethers.

Conditions in the extractor are effective to provide the propylene and/or propane extractant in the liquid phase. Illustrative conditions are temperatures of 50° F. or lower and pressures of 200 psia or more. Appropriate liquid phase conditions are readily determined from the various computer programs such as ASPEN PLUS which are known in the art and readily available. The relative flow rates of the aqueous stream and the hydrocarbon extractant stream are adjusted to provide for adequate contact and extraction of the propylene glycol and/or ether. Generally about 1 to 5 lbs. of hydrocarbon extractant per lb of aqueous stream to be purified is appropriate although amounts outside this range can be used.

The following example is provided to illustrate the invention.

An aqueous process stream from a direct oxidation propylene oxide process is introduced into extractor 1 via line 2 at the rate of about 74764 lbs/hr at a temperature of 50° F. and 200 psia pressure. The aqueous stream contains by weight about 2 wt % propylene glycol and about 10 wt % propylene glycol monomethyl ether.

Introduced to extractor 1 via line 3 is a liquid propylene extractant stream which is fed at the rate of about 210406 lbs/hr.; the propylene stream is introduced at a temperature of 50° F. and 250 psia pressure.

Extractor 1 is a conventional liquid liquid tower extractor with about 8 theoretical stages. The inmiscible liquids are subjected to thorough extractive contact in extractor 1 with the extract propylene stream removed at the rate of 219019 lbs/hr via line 4. The extract propylene stream is comprised by weight of 0.7% propylene glycol and 3.2% of propylene glycol monomethyl ether extracted from the aqueous feed stream. The extract stream passes to distillation column 6 for separation of various components.

The aqueous raffinate stream is removed from extractor 1 at the rate of about 66150 lbs/hr. This removed aqueous stream is greatly reduced in contained glycol and ether, comprising about 0.1 wt % propylene glycol and about 0.3 wt % propylene glycol monomethyl ether. The stream can be further treated as required.

Similar results are obtained using propane or propane/propylene mixtures as extractant.

From the above it can be seen that the extraction process of the present invention is highly effective for the separation of propylene glycol and ethers thereof from aqueous process streams by a procedure which is much less costly than other separation procedures such as distillation and which employs only materials which are otherwise used, for example, in propylene oxide production.

I claim:

1. A process for the separation of propylene glycol and/or ethers of propylene glycol from an aqueous stream containing minor amounts of these materials which consists of contacting said aqueous stream with liquid extractant selected from the group consisting of liquid propane, liquid propylene and a mixture of liquid propane and liquid propylene in a counter current liquid—liquid extraction and separating an aqueous stream reduced in propylene glycol and/or lower alkyl ethers thereof from a liquid extractant stream containing extracted propylene glycol and/or lower alkyl ethers thereof.

2. The process of claim 1 wherein the extractant is liquid propane.

3. The process of claim 1 wherein the extractant is liquid propylene.

4. The process of claim 1 wherein the extractant is a mixture of liquid propane and liquid propylene.

5. The process of claim 1 wherein said extractant stream contains propylene glycol and/or the monomethyl ether of propylene glycol.

* * * * *